(12) United States Patent
Priscal et al.

(10) Patent No.: US 11,952,187 B2
(45) Date of Patent: Apr. 9, 2024

(54) HIGH PERFORMANCE RECYCLABLE LID

(71) Applicant: AMCOR FLEXIBLES NORTH AMERICA, INC., Neenah, WI (US)

(72) Inventors: Michael D. Priscal, Neenah, WI (US); Jacob A Lasee, Neenah, WI (US)

(73) Assignee: AMCOR FLEXIBLES NORTH AMERICA, INC., Neenah, WI (US)

( * ) Notice: Subject to any disclaimer, the term of this patent is extended or adjusted under 35 U.S.C. 154(b) by 326 days.

(21) Appl. No.: 17/438,985

(22) PCT Filed: Aug. 21, 2019

(86) PCT No.: PCT/US2019/047530
§ 371 (c)(1),
(2) Date: Sep. 14, 2021

(87) PCT Pub. No.: WO2020/204985
PCT Pub. Date: Oct. 8, 2020

(65) Prior Publication Data
US 2022/0152999 A1    May 19, 2022

Related U.S. Application Data

(60) Provisional application No. 62/829,292, filed on Apr. 4, 2019.

(51) Int. Cl.
*B65D 65/40* (2006.01)
*B29C 51/14* (2006.01)
(Continued)

(52) U.S. Cl.
CPC .............. *B65D 65/40* (2013.01); *B29C 51/14* (2013.01); *B32B 27/08* (2013.01); *B32B 27/20* (2013.01);
(Continued)

(58) Field of Classification Search
CPC ...... B65D 65/40; B65D 75/32; B65D 75/327; B65D 77/2024; B65D 1/40;
(Continued)

(56) References Cited

U.S. PATENT DOCUMENTS

| 3,783,089 A | 1/1974 | Hurst et al. |
| 4,403,710 A | 9/1983 | Hirota et al. |

(Continued)

FOREIGN PATENT DOCUMENTS

| CA | 2003390 A1 * | 5/1990 | ............ C08L 51/06 |
| CA | 2288684 A1 * | 9/2000 | ............ C08F 210/16 |

(Continued)

OTHER PUBLICATIONS

Micho, Tubular Multilayer Stretch Film Manufacturing Technology and its properties and uses, China Academic Journal Electronic Publishing House, 1985, 13 pages.
(Continued)

*Primary Examiner* — Robert J Hicks (57) ABSTRACT

The film structure has a first exterior layer having a high-density polyethylene and an inorganic particle, a second exterior layer having a polyethylene-based material for sealing, and an interior layer having a high-density polyethylene, a nucleating agent and a hydrocarbon resin. The film may be use as a heat-sealable lid component for packaging and offers high moisture barrier, good heat resistance, and push-through and/or child-resistance performance while maintaining an overall composition acceptable for recycling.

17 Claims, 2 Drawing Sheets

(51) Int. Cl.
| | |
|---|---|
| *B32B 27/08* | (2006.01) |
| *B32B 27/20* | (2006.01) |
| *B32B 27/30* | (2006.01) |
| *B32B 27/32* | (2006.01) |
| *C08J 5/18* | (2006.01) |
| *C08K 3/26* | (2006.01) |
| *B65D 75/32* | (2006.01) |

(52) U.S. Cl.
CPC .......... *B32B 27/306* (2013.01); *B32B 27/327* (2013.01); *C08J 5/18* (2013.01); *C08K 3/26* (2013.01); *B32B 2250/03* (2013.01); *B32B 2250/04* (2013.01); *B32B 2250/242* (2013.01); *B32B 2250/246* (2013.01); *B32B 2264/10* (2013.01); *B32B 2264/104* (2013.01); *B32B 2307/308* (2013.01); *B32B 2307/31* (2013.01); *B32B 2307/4023* (2013.01); *B32B 2307/558* (2013.01); *B32B 2307/72* (2013.01); *B32B 2435/02* (2013.01); *B32B 2439/70* (2013.01); *B32B 2439/80* (2013.01); *B65D 75/327* (2013.01); *C08J 2323/06* (2013.01); *C08J 2331/04* (2013.01); *C08K 2003/265* (2013.01)

(58) Field of Classification Search
CPC ....... B65D 2251/0093; B65D 2251/205; C08J 5/18; C08K 3/26; B29C 51/14; B32B 27/08; B32B 27/20; B32B 27/306; B32B 27/30; B32B 2250/03; B32B 2250/04; B32B 2250/242; B32B 2250/246; B32B 2435/02; B32B 2439/70; B32B 2439/80; B32B 2307/31; B32B 2307/4023; B32B 2307/558; B32B 2307/308
USPC ......... 220/62.22, 62.11, 359.4, 359.3, 359.1; 215/232
See application file for complete search history.

(56) References Cited

U.S. PATENT DOCUMENTS

| | | | |
|---|---|---|---|
| 4,537,305 A | 8/1985 | Takanashi | |
| 4,684,025 A | 8/1987 | Copland et al. | |
| 5,522,506 A | 6/1996 | Roulin et al. | |
| 5,882,749 A | 3/1999 | Jones et al. | |
| 5,988,429 A | 11/1999 | Coe | |
| 6,006,913 A | 12/1999 | Ludemann et al. | |
| 6,312,825 B1 | 11/2001 | Su et al. | |
| 6,391,407 B1 | 5/2002 | Kashiba et al. | |
| 6,523,691 B2 | 2/2003 | Raj et al. | |
| 6,623,821 B1 | 9/2003 | Kendig | |
| 6,649,279 B2 | 11/2003 | Migliorini et al. | |
| 7,797,912 B2 | 9/2010 | Hammond et al. | |
| 8,418,871 B1 | 4/2013 | Lamasney | |
| 8,479,921 B2 | 7/2013 | Ingraham | |
| 9,694,959 B2 | 7/2017 | Priscal et al. | |
| 9,873,558 B2 | 1/2018 | Edwards | |
| 9,962,913 B2 | 5/2018 | Osborn et al. | |
| 10,562,701 B2 | 2/2020 | Lee et al. | |
| 2002/0103300 A1 | 8/2002 | Klosiewicz | |
| 2004/0016208 A1 | 1/2004 | Mumpower et al. | |
| 2004/0142131 A1 | 7/2004 | Edwards et al. | |
| 2004/0151932 A1 | 8/2004 | Galloway | |
| 2004/0163973 A1 | 8/2004 | Longo | |
| 2004/0251161 A1 | 12/2004 | Mueller et al. | |
| 2005/0186373 A1 | 8/2005 | Rhee et al. | |
| 2009/0324979 A1 | 12/2009 | Roussel et al. | |
| 2010/0015423 A1* | 1/2010 | Schaefer ................ | B32B 27/08 428/220 |
| 2010/0243508 A1 | 9/2010 | Sekiguchi et al. | |
| 2011/0005961 A1 | 1/2011 | Leplatois et al. | |
| 2011/0104342 A1 | 5/2011 | Glaser et al. | |
| 2011/0143155 A1 | 6/2011 | Aubee et al. | |
| 2011/0266189 A1 | 11/2011 | Tom et al. | |
| 2012/0021151 A1 | 1/2012 | Tatarka et al. | |
| 2012/0107542 A1 | 5/2012 | Nelson et al. | |
| 2012/0152954 A1 | 6/2012 | Bruehl et al. | |
| 2014/0008368 A1 | 1/2014 | Severini | |
| 2015/0132593 A1 | 5/2015 | Borse et al. | |
| 2015/0251814 A1 | 9/2015 | Campanelli et al. | |
| 2015/0298439 A1 | 10/2015 | Osborn et al. | |
| 2016/0051443 A1 | 2/2016 | Depla | |
| 2016/0066998 A1 | 3/2016 | Knowlton et al. | |
| 2017/0029189 A1 | 2/2017 | Sanders et al. | |
| 2017/0081099 A1 | 3/2017 | Proscal et al. | |
| 2017/0158400 A1 | 6/2017 | Priscal et al. | |
| 2019/0255824 A1* | 8/2019 | Su ........................... | B32B 27/32 |
| 2020/0165045 A1 | 5/2020 | Kondo et al. | |
| 2022/0111622 A1* | 4/2022 | Umphlett ............... | B65D 65/40 |

FOREIGN PATENT DOCUMENTS

| | | |
|---|---|---|
| CA | 2479738 A1 | 3/2005 |
| CN | 103131070 A | 6/2013 |
| CN | 102227311 B | 10/2014 |
| EP | 0144239 B1 | 2/1991 |
| EP | 0959020 A1 | 11/1999 |
| EP | 2090527 A1 | 8/2009 |
| EP | 2316644 A2 | 5/2011 |
| EP | 2520615 A1 | 11/2012 |
| EP | 3820697 A1 | 5/2021 |
| JP | 2017100419 A | 6/2017 |
| WO | 1998055537 A1 | 12/1998 |
| WO | 2002074843 A2 | 9/2002 |
| WO | 2007078454 A2 | 7/2007 |
| WO | 2016128865 A1 | 8/2016 |
| WO | 2017106120 A2 | 6/2017 |
| WO | 2018108776 A1 | 6/2018 |
| WO | 2020074688 A1 | 4/2020 |
| WO | 2020204984 A1 | 10/2020 |
| WO | 2020205061 A1 | 10/2020 |
| WO | 2020206301 A1 | 10/2020 |

OTHER PUBLICATIONS

PCT International Search Report, International Application No. PCT/US2019/047530, dated Oct. 29, 2019, 2 pages.

Seven, Karl M., "Nucleating Agents for High Density Polyethylene—A Review", Polymer Engineering and Science, published online in Wiley Online Library (wileyonlinelibrary.com), pp. 541-554, 2016.

* cited by examiner

HIGH PERFORMANCE RECYCLABLE LID

TECHNICAL FIELD

This disclosure is related to film structures, in particular high-performance recyclable films that are suitable for packaging. The films described herein are based on high-density polyethylene materials useful for lidding on cups or trays.

BACKGROUND

High-performance packaging films are used to package many products such as food, pharmaceuticals, consumer goods or industrial items. Products that are sensitive to their environment use specially designed packaging to help protect the product and extend the shelf-life to a point in time where a consumer can use the product. Often these packages are made from various types of polymers and additives that offer the properties needed to achieve "high-performance". The materials chosen for the packaging may enhance barrier properties, physical properties or aesthetics, among other things. Usually, the design of the packaging includes multiple materials to achieve several characteristics.

The combination of materials in a single packaging material can create difficulties when determining how to dispose of the packaging after use. Often, recycling is most efficient or may only be possible if the materials in the package are of the same polymer type. Efforts to use recyclable packaging materials, especially those that use a singular polymer type, results in lower performance and/or significantly higher costs. Lower performance characteristics encountered might be visual defects, less barrier and shorter shelf-life, slower speeds on packaging equipment, to name a few.

One polymer type that is particularly suitable for recycling is high-density polyethylene. This material has been used for milk jugs and other bottles for many years. The bottles are 100% high-density polyethylene and provide suitable barrier properties given the thick walls. In many countries, there is a current process in place to collect, sort and recycle these packages.

However, the use of high-density polyethylene as a main component has not translated to most flexible packaging formats, especially those with demanding requirements. For example, high-density polyethylene has good enough moisture vapor barrier properties for dry goods such as cereal, but not good enough for highly sensitive items such as pharmaceuticals. High-density polyethylene also does not have good enough heat resistance for high speed packaging lines. For these reasons, and others, high-density based packaging films are not used in many high-performance packaging applications, frustrating the recyclability of these items.

SUMMARY

The structure and material components of the lid packaging components described herein are configured for several advantages, resulting in a high-performance lid that is recyclable. The lid provides moisture barrier, good heat resistance, and push-through functionality and/or child resistance. The lidding is further designed to provide good heat seal strength when heat sealed to a high-density polyethylene material, even at relatively low sealing temperatures and low seal dwell time. The combination of these high-performance packaging characteristics in a recyclable high-density polyethylene-based film structure is unique and unexpected.

In various embodiments the lid packaging components include a first exterior layer having a high-density polyethylene and an inorganic particle, a first interior layer having a high-density polyethylene and a hydrocarbon resin, and a second exterior layer. The inorganic particle may include calcium carbonate and the inorganic particle may be loaded into the first exterior layer at an amount of 15% by weight.

The first interior layer may also include a nucleating agent and the second exterior layer may have a polyethylene-based material such as a polyethylene plastomers or an ethylene vinyl acetate copolymer. The first interior layer may have a volume that is from 50% to 90% of the total volume of the lid packaging component. The lid packaging component may additionally have printed indicia adjacent to the first exterior layer and a second interior layer containing ethylene vinyl alcohol copolymer.

In some embodiments the lid packaging component has a heat seal initiation temperature of less than 130° C. when the lid is sealed to high-density polyethylene under conditions of 0.5 seconds and 30 psi. The polyethylene-based material of the second exterior layer may have a heat seal strength between about 3 N/2.5 cm and about 29.4 N/2.5 cm when the lid packaging component is heat sealed to high-density polyethylene at conditions of 0.5 seconds and 30 psi.

The lid packaging component may be useful for push-through blister packaging configurations. Various embodiments of the lid packaging components have a puncture resistance of less than about 12 Newtons or less than about 7 Newtons when tested according to ASTM F1306 using a ⅛ inch ASTM probe against the second exterior layer side of the lid.

Advantageously, some embodiments of the lid packaging component have a total composition suitable for recycling. The lid may be essentially free from polyester, ethylene vinyl alcohol copolymer and polyamide.

Various embodiments of packaged products disclosed herein include a lid packaging component, a product and a thermoformed base that has at least one cavity and a flange surrounding each of the cavities. The lid is hermetically sealed to the flange of the thermoformed base thereby enclosing the product within the cavity of the thermoformed base. Some embodiments include a lid that is peelably sealed to the base. Some embodiments of the packaged product include a lid that allows for product dispensing. The lid can be punctured by a product when the cavity of the base is depressed manually.

The packaged product may include a thermoformed base containing high-density polyethylene. In some embodiments, the lid and the base may be recyclable in the same recycle process. In some embodiments the thermoformed base has a first layer having a high-density polyethylene and a nucleating agent, a second layer having a high-density polyethylene and optionally a hydrocarbon resin and/or a nucleating agent and a third layer having a high-density polyethylene and a nucleating agent, the second layer located between the first and third layer.

BRIEF DESCRIPTION OF THE DRAWINGS

The disclosure may be more completely understood in consideration of the following detailed description of various embodiments of the disclosure in connection with the accompanying drawings, in which.

The drawings show some but not all embodiments. The elements depicted in the drawings are illustrative and not necessarily to scale, and the same (or similar) reference numbers denote the same (or similar) features throughout the drawings.

DETAILED DESCRIPTION

Described herein is a high-density polyethylene-based film suitable for packaging products that might be sensitive to oxygen and/or moisture. The film may be used as a lid packaging component and may be heat sealed to a thermoformed base packaging component, creating a package that may be accepted in a high-density polyethylene recycling process. The high-performance packaging may be suitable for products such as, but not limited to, pharmaceuticals, nutraceuticals, medical products, fresh foods, refrigerated foods, shelf-stable foods, consumer goods, cosmetics and chemicals.

The structure and material components of the lid packaging component are uniquely configured to provide moisture barrier, heat resistance, excellent high-speed sealing characteristics, push-through functionality and recyclability options. Surprisingly, the films described herein are polyethylene based, yet have performance properties that allow them to be used for lidding in pharmaceutical blister packaging. The lid packaging component films can be designed for child resistance and/or push-through performance.

The lid packaging components described herein are particularly useful for blister packages that require push-through functionality. Typical push-through lidding incorporates a foil material to achieve the correct puncture resistance. Unexpectedly, the lid packaging components described herein have excellent push-through functionality that can be varied for a specific application, while maintaining an all-polyethylene structure that is easily recycled.

The packages described herein, incorporate at least two packaging components. First is a thermoformed base component, made from a high-density polyethylene-based film. The thermoformed cavity may be deep or shallow and is generally shaped to hold the intended product therein. Second is a lid packaging component. The lid packaging component is configured for hermetic high-speed heat sealing to the thermoformed base component, producing a protective package for the product.

In some embodiments of the package, both the high-performance lid component and the thermoformed base component have a composition high in high-density polyethylene. The combination of the thermoformed base component and the lid packaging component provides for superior package characteristics while keeping a highly homogeneous polymer composition (essentially comprising polyethylene, mostly high-density polyethylene) to provide for the opportunity to recycle the entire package in a single stream, such as the high-density polyethylene bottle stream.

The packaging components described herein are unique in that they are produced using high levels of high-density polyethylene, yet retaining high-performance characteristics required for demanding packaging applications. The hermetically sealed packages provide excellent product protection (i.e. moisture barrier), good appearance, good heat resistance, and good seal strength. Packages with these levels of performance have not previously been delivered using materials that can be easily recycled.

Lid Packaging Component

Figure 1:
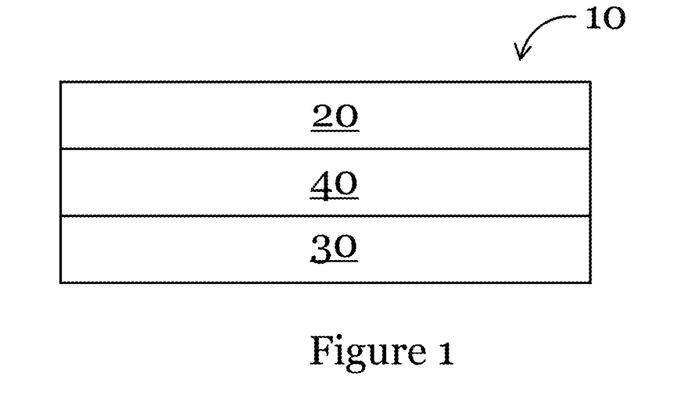
FIG. 1 is a schematic of a cross-section of an embodiment of a lid packaging component having a first exterior layer, a first interior layer and a second exterior layer.

The lid packaging component 10 is a multilayer film that has at least a first exterior layer 20, a second exterior layer 30 and a first interior layer 40, as shown in FIG. 1. There may be additional layers in the lid packaging component as well.

The term "layer", as used herein, refers to a building block of films that is a structure of a single material type or a homogeneous blend of materials. Films contain one or more layers that are connected to each other. A layer may contain a single polymer, a blend of materials within a single polymer type (i.e. polyethylene) or a blend of various polymer types, may contain metallic materials or other non-polymer materials and may have additives. Layers may be continuous with the film or may be discontinuous or patterned in comparison to the film. A multilayer film has two exterior layers, opposite each other, on each of the film's major surfaces. An exterior layer is one that is located at the surface of a film and is not connected to another layer of that film at that surface. A multilayer film may have one or more interior layers. An interior layer is one that is not located at the surface of a film and necessarily has another layer on each side of it.

The first exterior layer of the lid packaging component contains a high-density polyethylene and an inorganic particle. The high-density polyethylene should be present in the first exterior layer at an amount greater than 80%, an amount greater than 85%, or about 90% or more, by weight. Two or more different high-density polyethylene materials may be used in the first exterior layer. As used throughout this application, the term "high-density polyethylene" or "HDPE" refers to both (a) homopolymers of ethylene which have densities from about 0.960 g/cm3 to about 0.970 g/cm3 and (b) copolymers of ethylene and an alpha-olefin (usually 1-butene or 1-hexene) which have densities from about 0.940 g/cm3 to about 0.958 g/cm3. High-density polyethylene includes polymers made with Ziegler or Phillips type catalysts and polymers made with single site metallocene catalysts. The high-density polyethylene may be bimodal and may be pre-nucleated.

Examples of pre-nucleated high-density polyethylene materials that may be suitable for the lid packaging component are Grade M6020SB available from Equistar and HPS167AB available from Nova Chemicals. Examples of un-nucleated high-density polyethylene materials that may be suitable for the lid packaging component Grade M6020 or Grade L5885, both available from Equistar.

Incorporated into the high-density polyethylene of the first exterior layer is an inorganic particle which is present in an amount of between 10% and 50% (by weight) relative to the total weight of the first exterior layer. In some embodiments of the lid packaging component, the amount of inorganic particle in the first exterior layer is about 15%. The amount of inorganic particle required depends partially on the type of inorganic particle. For example, plate shaped particles such as talc provide excellent heat resistance properties and may help lower the required loading of inorganic particles. The heat resistance of the first exterior layer may be most effectively increased by a blend of more than one type of inorganic particle. If a blend of inorganic particles is used, the total weight of the various inorganic particles should be in an amount of between 10% and 50%, by weight, of the first exterior layer. As used herein, the reference to "the inorganic particle" or "an inorganic particle" includes a blend of more than one type of inorganic particle.

The inclusion of the inorganic particle is an important aspect of the lid packaging component such that the resulting film has enough heat resistance to withstand sealing to another packaging component without wrinkling, shrinking or otherwise becoming visually imperfect. The first exterior layer should have enough heat resistance that it does not stick to the heated seal bar (or roller, plate, etc.) The inorganic particle is at least one material selected from the group consisting of talc, titanium oxide, carbon black, calcium carbonate, powdered glass, gypsum, pryophyllite silicate, magnesium carbonate, kaolin, clay, calcium sulfite, aluminum hydroxide, barium sulfate and magnesium oxide. In one preferred embodiment, the inorganic particle is calcium carbonate, silica, talc, titanium dioxide or a blend of two or more of these. In an exemplary embodiment, the inorganic particle is calcium carbonate.

The first exterior layer may have other components in addition to the high-density polyethylene and the inorganic particle. For example, the first exterior layer may include another type of polyethylene. If the inorganic particle is added to the first exterior layer by way of a masterbatch, the carrier polymer (typically low-density polyethylene or linear low-density polyethylene) is also a component of the layer. Any additional components to the first exterior layer should be compatible with the intended recycling process.

Moving to the first internal layer of the lid component, this layer also contains a high-density polyethylene. In some embodiments, the first interior layer contains a high-density polyethylene, a hydrocarbon resin and a nucleating agent. In some embodiments, the first internal layer of the lid packaging component film contains a high-density polyethylene and a hydrocarbon resin or a nucleating agent.

The high-density polyethylene should be present in the first interior layer at an amount of about 50% to about 90%, by weight. The high-density polyethylene may be present in the first interior layer at an amount greater than 80% or an amount greater than 85%. Two or more different high-density polyethylene materials may be present in the first interior layer. The nucleating agent may be present in the first interior layer of the lid packaging component at a level from about 0.2% to about 3.5% by weight of the layer. The hydrocarbon resin may be present in the second layer at an amount between 0% and 50%. The upper limit of hydrocarbon resin used may be dictated by processing issues (i.e. insufficient melt strength during extrusion) or film properties. For example, high levels of hydrocarbon resin may cause interlayer adhesion problems or film brittleness. The amount of hydrocarbon used in the first interior layer will also depend on the type of hydrocarbon resin used and the thickness of the first interior layer. For example, a thinner first interior layer may be able to be processed with a higher level of hydrocarbon resin before issues are encountered.

In some embodiments of the lid packaging component, the hydrocarbon resin may be present at a level up to 30%, by weight. The hydrocarbon resin may be loaded into the first interior layer at a level between 2.5% and 30%. Some embodiments of the lid packaging component will have hydrocarbon resin levels in the first interior layer between 5% and 20%, by weight. In exemplary embodiments, the hydrocarbon resin is present at an amount of about 15% or about 7.5%. The level of hydrocarbon resin may be adjusted to control both the moisture barrier properties of the film and the puncture resistance (push-through functionality). Increasing the hydrocarbon resin level increases the moisture barrier properties of the film. Increasing the hydrocarbon resin level increases the ease with which the film can be punctured, which may be desired for push-through lidding applications. Again, the amount of hydrocarbon resin needed to achieve various levels of these performance characteristics is also influenced by the thickness of the first interior layer.

As used herein, the phrase "hydrocarbon resin" refers to a low molecular weight product (molecular weight less than about 10,000 Daltons) produced by polymerization from coal tar, petroleum, and turpentine feed stocks. A hydrocarbon resin may comprise any of those hydrocarbon resins disclosed in U.S. Pat. No. 6,432,496, issued Aug. 13, 2002, or in U.S. Patent Application 2008/0286547, published Nov. 20, 2008, both of which are incorporated in their entireties in this application by this reference. More specifically, as a non-limiting example, the hydrocarbon resin may include petroleum resins, terpene resins, styrene resins, cyclopentadiene resins, saturated alicyclic resins or mixtures of such resins. Additionally, as a non-limiting example, the hydrocarbon resin may comprise hydrocarbon resin derived from the polymerization of olefin feeds rich in dicyclopentadiene (DCPD), from the polymerization of olefin feeds produced in the petroleum cracking process (such as crude C9 feed streams), from the polymerization of pure monomers (such as styrene, α-methylstyrene, 4-methylstyrene, vinyltoluene or any combination of these or similar pure monomer feedstocks), from the polymerization of terpene olefins (such as α-pinene, β-pinene or d-limonene) or from a combination of such. The hydrocarbon resin may be fully or partially hydrogenated. Specific examples of hydrocarbon resins include but are not limited to Plastolyn® R1140 Hydrocarbon Resin available from Eastman Chemical Company (Kingsport, Tenn.), Regalite® T1140 available from Eastman Chemical Company (Kingsport, Tenn.), Arkon® P-140 available from Arakawa Chemical Industries, Limited (Osaka, Japan) and Piccolyte® 5135 Polyterpene Resins available from Hercules Incorporated (Wilmington, Del.).

As used throughout this application, the term "nucleating agent" refers to an additive that forms nuclei in a polymer melt to control the growth of crystals. The nucleating agent can be any of the type that is capable of nucleating high-density polyethylene and may be added at the point of polymerization of the high-density polyethylene (pre-nucleated high-density polyethylene) or at a later point in time by way of the addition of and melt blending a nucleating agent containing masterbatch. Examples of nucleation additives include minerals such as chalk, talc, clay, kaolin, silicates and the like, and organic agents such as salts of aliphatic or aromatic carboxylic acids, aromatic salts, metallic salts of aromatic phosphorous compounds, quinaridones, and aromatic amides. Further examples of nucleating agents include zinc glycerolate, calcium glycerolate, calcium hexahydrophthalate, zinc hexahydrophthalate, salts and the like, and mixtures thereof. The nucleating agent may be present in the first interior layer of the lid packaging component at a level from about 0.2% to about 3.5% by weight of the layer.

Examples of nucleating agent masterbatch materials that may be suitable for the lid packaging component are Hyperform® HPN nucleating agents available from Milliken.

The first interior layer of the lid packaging component delivers critical properties important to the film. The first interior layer should have a volume (i.e. thickness) from about 50% to about 90% of the total volume of the lid package component.

In some embodiments of the lid packaging component, the film is designed for use in packaging applications that use "push-through" functionality for dispensing of the products (pharmaceutical or gum packaging, for example). In this case, the first interior layer may have a hydrocarbon resin content that allows for the desired push-through ease.

One advantage of the lid packaging components disclosed herein is that they heat seal to other packaging components (including itself) at relatively low sealing temperature and low dwell time. The second exterior layer of the lid package component is designed for low temperature sealing and contains polyethylene-based material(s). Even though the first exterior layer is designed for high heat resistance, the temperatures at which the material can be heat sealed without significant distortion is still quite low when compared to typical sealing conditions on high-speed packaging equipment. In some embodiments, the second exterior layer must seal to another package component at sealing temperatures of 130° C. or less. In some embodiments, the second exterior layer must seal to another package component at sealing temperatures of 11° C. or less. In some embodiments, the second exterior layer must seal to another package component at sealing temperatures of about 100° C. The lid packaging component should have a heat seal initiation temperature of 130° C. or less when heat sealed to high-density polyethylene under conditions of 0.5 seconds and 30 psi. In some embodiments, the lid packaging component should have a heat seal initiation temperature of 110° C. or less when heat sealed to high-density polyethylene under conditions of 0.5 seconds and 30 psi. As used herein, "heat seal initiation temperature" is the minimum temperature at which a prescribed heat seal achieves a seal strength of 1,000 g/in.

As used herein, "polyethylene-based materials" are homopolymers or copolymers that include ethylene linkages. Examples of polyethylene-based materials that may be useful in the second exterior layer of the lid package component include ethylene vinyl acetate copolymer or polyethylene plastomers, such as ethylene-alpha olefin copolymers. Useful polyethylene-based materials for the second exterior layer may have a melt temperature of 8° C. or less. Useful polyethylene-based materials for the second exterior layer may have a softening point of about 50° C. or less.

In some embodiments, the second exterior layer contains an ethylene vinyl acetate copolymer. As used throughout this application, the term "ethylene vinyl acetate copolymer" refers to copolymers comprised of repeating units of ethylene and vinyl acetate. Ethylene vinyl acetate copolymers may be represented by the general formula: $[(CH_2-CH_2)_n-((CH_2-CH(COO)(CH_3))_m]$. The vinyl acetate content may vary from less than 2% to greater than 95% by weight (of total ethylene vinyl acetate copolymer composition). The vinyl acetate content of ethylene vinyl acetate copolymers for packaging applications may vary from 2% to 40% by weight. Typically, the vinyl acetate content of ethylene vinyl acetate copolymers for packaging application can vary from about 2% to 28% by weight. Examples of commercially available ethylene vinyl acetate copolymers include Escorene™ copolymers available from ExxonMobil.

In some embodiments, the second exterior layer contains a polyethylene plastomer. As used throughout this application, the term "polyethylene plastomer" refers to ethylene alpha olefin copolymers that have properties of both elastomers and plastics. Examples of polyethylene plastomers include those available in the Affinity™ Polyolefin Plastomers grade slate available from The Dow Chemical Company.

The second exterior layer should have a thickness of at least 10%, relative to the total thickness of the lid packaging component. In some embodiments, the second exterior layer is roughly 20% of the lid packaging component. The second exterior layer may have a thickness between 10 and 30% of the thickness of the lid packaging component.

Some examples of material blends (by weight) that have been used successfully in the second exterior layer of the lid packaging component are given below as Seal Blend 1 and Seal Blend 2. Acceptable heat seal strength may vary by application and can be measured by ASTM F88 (test speed 12 in/min, unsupported tail). The second exterior layer should be formulated to achieve heat seal strength of at least 300 g/in (3 N/2.5 cm), at least 800 g/in (7.9 N/2.5 cm) or at least 900 g/in (8.8 N/2.5 cm). In some embodiments of the lid packaging component, the heat seal strength between the lid packaging component and another packaging component is between 300 g/in (3 N/2.5 cm) and 3,000 g/in (29.4 N/2.5 cm). The heat seal strength may be between 500 g/in (4.9 N/2.5 cm) and 2,500 g/in (24.5 N/2.5 cm). In this range, the heat seal is manually peelable and the two components are peelably sealed to each other. In some embodiments, the heat seal strength is high enough that the failure during heat seal strength testing is by material breaking, and thus there is no recorded seal strength.

Seal Blend 1: 86% ethylene vinyl acetate copolymer [26% VA], 10% slip masterbatch, 3% antiblock masterbatch and 1% process aid masterbatch (each masterbatch has a polyethylene carrier)

Seal Blend 2: 94% plastomer (ethylene-octene copolymer), 5% antiblock masterbatch, 1% process aid masterbatch (each masterbatch has a polyethylene carrier)

Any additional materials present the first exterior layer, the second exterior layer or the first interior layer of the lid packaging component, or present in other layers of the lid packaging component should be acceptable to the high-density recycling process. The additional materials may be present at a low level such that they do not disrupt or otherwise hamper the recycling process. The additional materials may be of a type that is acceptable to the recycling process, such as other types of polyethylene-based materials. The additional materials that are not polyethylene-based may be present along with a compatibilizer system.

Figure 2:
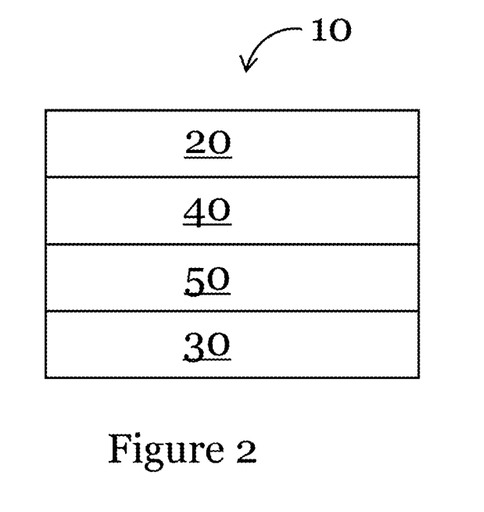
FIG. 2 is a schematic of a cross-section of an embodiment of a lid packaging component having a first exterior layer, a first interior layer, a second interior layer and a second exterior layer.

The lid packaging component may include other layers. For example, the lid packaging component may have a second interior layer as shown in FIG. 2. Here, the lid packaging component 10 includes a first exterior layer 20, a second exterior layer 30, a first interior layer 40 and a second interior layer 50. In some embodiments, the second interior layer 50 contains ethylene vinyl alcohol copolymer to provide additional oxygen barrier. In this scenario, the second interior layer 50 may be very thin such that the ethylene vinyl alcohol copolymer is not present at a level that it disrupts the recycling process or the lid packaging component also contains a compatibilizer that allows the ethylene vinyl alcohol copolymer to be processed in the recycling unit without causing defects. The oxygen transmission level of the may be about 0.2 cc/100 in$^2$/day or less.

Other layers may be present in the lid packaging component, as long as these layers are not detrimental to the properties of the film (i.e. the materials must be acceptable to the high-density recycling process). Other layers may be present at any location of the lid packaging component.

Other layers may be present in the lid packaging component with the configuration (position and attachment) that they can be removed from the portion that contains the first exterior layer, the second exterior layer and the first interior layer. For example, the lid packaging component may include a paper-based layer adjacent to the first exterior. This paper-based layer may be attached by an adhesive that allows the consumer to peel away the paper-based layer. In this way, the paper-based layer can be discarded or recycled separately from the remainder of the package.

Figure 3:
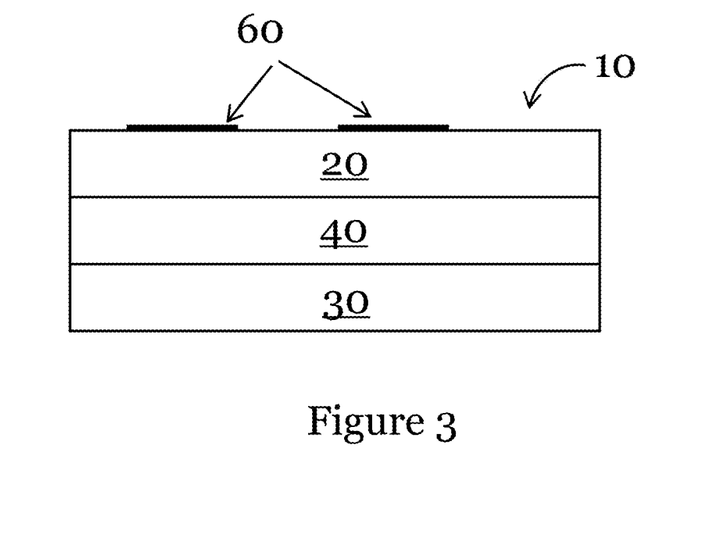
FIG. 3 is a schematic of a cross-section of an embodiment of a lid packaging component including printed indicia.

Additionally, the lid packaging component may include printed indicia. Some embodiments of the lid packaging component include printed indicia 60 on the exterior surface of the first exterior layer 20 (i.e. printed indicia is adjacent to the first exterior layer), as shown in FIG. 3. Printed indicia may be visible from one side or both sides of the lid packaging component and the indicia may be located on the surface of the lid packaging component or between any of the layers present in the lid packaging component.

The lid packaging component may be fully coextruded or may be produced by other processes such as lamination or coating or combination of processes. Preferably, the lid packaging component film is not oriented.

Overall, the lid packaging component may have a thickness from about 1 mil (25.4 micron) to about 10 mil (254 micron). Some packaging applications would benefit from a lid packaging component that has a thickness from about 2 mil (50.8 micron) to about 8 mil (203.2 micron). In some embodiments, the lid packaging component has a thickness from about 2 mil (50.8 micron) to about 6 mil (152.4 micron). In some embodiments, the lid packaging component has a thickness of about 2 mil (50.8 micron). In some embodiments, higher child resistance is required and the lid packaging component has a thickness of about 4 mil (101.6 micron).

The lid packaging component should have a total composition suitable for recycling. The lid packaging component should have a total composition suitable for recycling in a process that typically accepts polyethylene-based materials. The total composition may be suitable for recycling in a process that accepts high-density polyethylene materials.

The lid packaging components described herein may be recycled after their primary use is completed. In general, the term recyclable means that the product is suitable for reuse. An example of one specific context of recyclable is reusing a plastic grocery bag a second time to contain some other items. The plastic bag has been reused and recycled. In a slightly different context, recyclable means that the product is suitable for reuse after being converted into a new product. As used herein, the term "suitable for recycling" is meant to indicate that the film can be converted into a new useful item, by means of reprocessing in a polyolefin recycle stream (i.e. recycling streams based on polyethylene). Reprocessing may entail washing, separating, melting and forming, among many other steps. Typically, when plastic packaging is recycled by reprocessing, the material is mechanically chopped into small pieces, melted, mixed and reformed into the new product. If multiple incompatible materials are present in the packaging, interactions occur during reprocessing causing gels, brittle material, poor appearance and generally un-usable or poor-quality products. Using the term "recyclable" indicates that these drawbacks are generally not present. Qualification as a recyclable material is not regulated by any specific agencies but can be obtained from specific groups such as Association of Plastic Recyclers (APR) and How2Recycle™. Recyclable films disclosed herein may be suitable for high-density polyethylene-based recycling streams. Introduction of a recyclable film into any of these recycling-by-reprocessing avenues should not require additional compatibilizer.

A total composition suitable for recycling may be obtained by keeping the overall amount of high-density polyethylene in the total composition of the lid packaging component at a high level. Any additives used should be kept to a minimum. Any non-polyethylene based polymers present may be accompanied by compatibilizers to achieve a composition suitable for recycling. For ideal recyclability options, the composition of the lid packaging component consists of high-density polyethylene, inorganic particles, hydrocarbon resin, nucleating agent, other processing additives such as slip or antiblock, and other polyethylene-based polymers. The lid packaging component may be free from non-polyethylene-based polymers. The lid packaging component may be free from metal.

To further efforts to achieve a total composition that is suitable for recycling, some embodiments of the lid packaging component may be free from polyester materials. Polyester materials are typically used in films because of the durability, stiffness and clarity. However, the presence of polyester may greatly hinder the recyclability of the film.

To further efforts to achieve a total composition that is suitable for recycling, some embodiments of the lid packaging component may be free from EVOH materials. EVOH is typically used in films because it is an efficient and extrudable oxygen barrier material. However, the presence of EVOH may greatly hinder the recyclability of the film.

To further efforts to achieve a total composition that is suitable for recycling, some embodiments of the lid packaging component may be free from polyamide materials. Polyamide materials are typically used because of the durability and stiffness. However, the presence of polyamide may greatly hinder the recyclability of the film.

The lid packaging component may be free from polyester, EVOH and polyamide.

It has been found that a lid packaging component as described herein, having at least a first exterior layer, a second exterior layer and a first interior layer, can be used as high-performance packaging with excellent results. This is surprising as the lid packaging component contains a high amount of high-density polyethylene which has previously been shown to not have an acceptable combination of properties for high-performance packaging applications. The lid packaging component described herein delivers a critical and previously unachieved combination of 1) push through functionality, 2) high heat resistance, 3) high-speed sealability to high-density polyethylene, 4) recyclability and optionally 5) high moisture barrier.

Most surprising is the combination of moisture barrier and push-through characteristics of the lid packaging components described herein. These characteristics are achieved while maintaining a structure suitable for recycling in a high-density recycling process. Previously, this type of performance combination was only achievable by using a foil containing structure that would not be recyclable.

The lid packaging components advantageously have excellent moisture barrier. The moisture barrier property is dependent on the layer composition. One way to increase the moisture barrier is to increase the amount of hydrocarbon resin or nucleating agent in the first interior layer. Another way to increase the moisture barrier is to use a bimodal high-density polyethylene. The moisture barrier performance of the lid packaging component is important as it allows this material to replace other standard packaging films which may not be easily recyclable, such as PVC, for packaging moisture sensitive products.

The lid packaging components advantageously have push-through functionality which can be adjusted to the required puncture strength.

Packaged Product

The lid packaging components may be used in conjunction with other packaging components (such as thermoformed trays) to produce packaging for a wide variety of products. The lid packaging components may be used as a lid on a tray or in another packaging format such as a pouch.

The lid packaging component may be attached to another packaging component or itself by way of a seal, preferably a hermetic seal. In this manner, the product inside the package is completely enclosed in the cavity and protected by way of the lid packaging component and the other packaging component(s). The exchange of gasses, liquids, microbes or other materials is limited to those that are able to pass through the packaging components, as the hermetic seal does not permit passage in the space between the components.

In one embodiment of a packaged product, the lid packaging component is combined with a thermoformed base to form the package. The thermoformed base has one or more cavities to hold the product, each cavity surrounded by a flange. The flange is an unformed portion of the base that serves as a place to connect the thermoformed base to the lid packaging component. The connection may be a hermetic seal between the second exterior layer of the lid packaging component and the surface of the flange of the thermoformed base component. In some embodiments, the lid component is hermetically sealed to the flange in areas surrounding each of the cavities of the thermoformed base such that each cavity is individually hermetically sealed (i.e. no channel of gas communication between the cavities). Alternatively, the lidding may be connected to the thermoformed base at the flange in an area including the entire perimeter surrounding all the cavities, and not between each of the cavities.

The product that is contained in the cavities of the thermoformed base is not limited. The product may be sensitive to the environment such as pharmaceuticals or foods. The product may require physical protection, such as delicate medical devices. The product may need to be contained for consumer protection, such as medicaments or cleaners that should be in child proof packaging. The product may be suitable for easy single-unit dispensing such as gum or candy in a multipack.

Figure 4:
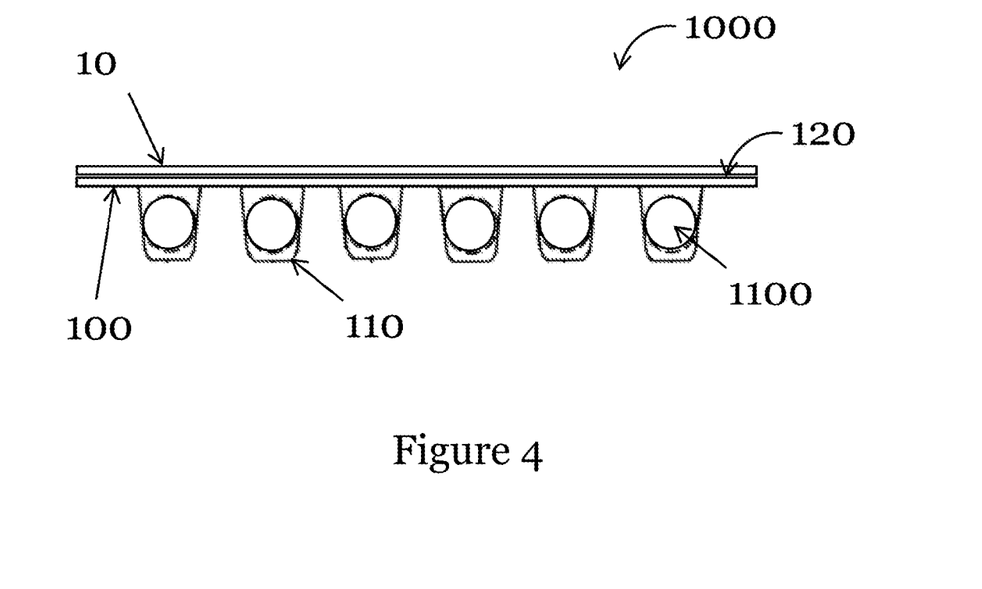
FIG. 4 is a schematic of a cross-section of an embodiment of a packaged product including a lid packaging component and a thermoformed base component.

One example of a packaged product 1000 using a lid packaging component 10 and a thermoformed base 100 is shown in the cross-sectional schematic of FIG. 4. In this embodiment the thermoformed base 100 has multiple (6 shown) cavities 11o, each containing a product 1100, surrounded by a flange 120. In general, the cavities of a thermoformed base may be sized specifically to hold an individual pharmaceutical tablet or capsule. Alternatively, the cavity of a thermoformed base may be large and hold multiple product pieces. Cavities of all numbers, sizes and shapes are anticipated by this application.

In some embodiments, the packaged product consists of a product, a lid packaging component and a thermoformed base, the lid and the base being fusion sealed. The lid packaging component may be formulated as described herein such that the product can be pushed through the lid for dispensing. Typically, films having high levels of high-density polyethylene exhibit a stretching in response to "push-through" forces. However, the lid packaging components described herein that include a first interior layer having hydrocarbon resin exhibit a "pop" type puncture resistance, suitable for push-through dispensing. Particularly for applications of a packaged product that include pharmaceutical tablets, gum pieces or the like, the cavities of the thermoformed base may flexible enough that a consumer can depress the cavity manually, forcing the product through the lid component, for dispensing.

The thermoformed base should have a moisture and/or oxygen barrier that is similar in performance to the lid packaging component. Some embodiments of the packaged product include a lid packaging component and a thermoformed base that each have a total composition suitable for recycling. The lid packaging component and the thermoformed base may have a total composition that is suitable for recycling in the same recycling stream. Both the lid packaging component and the thermoformed base may be suitable for recycling in a high-density polyethylene stream.

Figure 5:
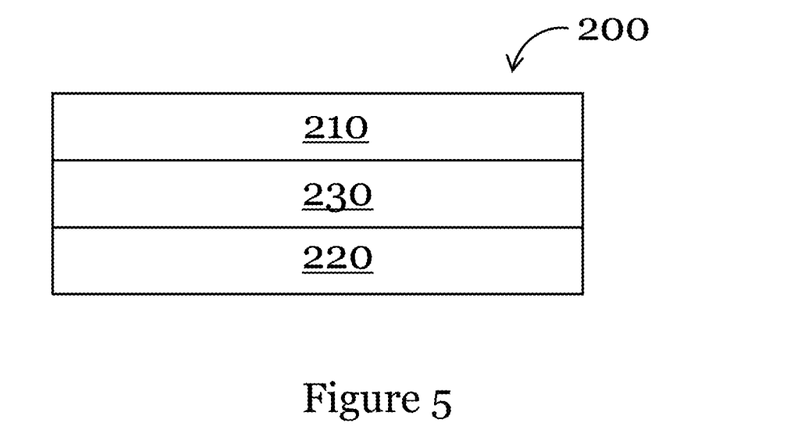
FIG. 5 is a schematic of an embodiment of a thermoformable base film including three layers.

One example of a thermoformable film 200 that could be formed into a thermoformed base that may be sealed to a lid packaging component to provide a packaged product is shown in FIG. 5. The thermoformable film 200 may have a first layer 210 containing high-density polyethylene and a nucleating agent. The thermoformable film may have a second layer 230 that has a high-density polyethylene, optionally a hydrocarbon resin and optionally a nucleating agent. The thermoformable film may have a third layer 220 having a high-density polyethylene and a nucleating agent. One advantage to the thermoformable base film as shown in FIG. 5 is that it would have similar recyclability as compared to the lid packaging components described herein, such that the entire package could be recycled together without separating.

EXAMPLES AND DATA

Two "push-through" style embodiments of the lid packaging component were tested using a slow puncture test (ASTM 1306, ⅛ inch diameter ASTM probe contacts sealant side), for comparison to standard push-through lidding. The lid packaging component structures tested are outlined in Table 1. Example 1 has a first interior layer containing about 15% hydrocarbon resin and resulted in a puncture resistance of less than 7 Newtons. Example 2 has a first interior layer containing about 7.5% hydrocarbon and resulted in a puncture resistance of less than about 12 Newtons. Comparatively, a standard push through foil lid having 25 micron soft temper foil with a 12 micron polyethylene based sealant exhibited a puncture resistance of less than 6 Newtons. Another standard push through lid having 20 micron hard temper foil with a 12 micron polyethylene based sealant exhibited a puncture resistance of less than 4 Newtons. The lid packaging components described herein have a push-through force similar to foil containing structures.

TABLE 1

| | Lid Packaging Component Structures | | | |
| --- | --- | --- | --- | --- |
| | Example 1 | | Example 2 | |
| Film Layer (see FIG. 1) | Layer % (by mass) | Layer Components | Layer % (by mass) | Layer Components |
| 1 (first exterior layer) | 15.72 | 70% HDPE 30% CaCO$_3$ MB | 15.72 | 70% HDPE 30% CaCO$_3$ MB |

TABLE 1-continued

Lid Packaging Component Structures

| Film Layer (see FIG. 1) | Example 1 | | Example 2 | |
|---|---|---|---|---|
| | Layer % (by mass) | Layer Components | Layer % (by mass) | Layer Components |
| 2 (first interior layer) | 64.02 | 62.5% pre-nucleated HDPE 37.5% HC MB | 64.02 | 81.25% pre-nucleated HDPE 18.75% HC MB |
| 3 (second exterior layer) | 20.26 | 86% EVA 14% additive masterbatch | 20.26 | 86% EVA 14% additive masterbatch |
| Film Thickness | 4 mil (101.6 micron) | | 4 mil (101.6 micron) | |

$CaCO_3$ MB = polyethylene with greater than 30% inorganic content
HC MB = hydrocarbon masterbatch containing 40% hydrocarbon and 60% high-density polyethylene

EMBODIMENTS

Lid Packaging Component Embodiments:
A. A lid packaging component comprising:
  a first exterior layer comprising a high-density polyethylene and an inorganic particle,
  a first interior layer comprising a high-density polyethylene, a nucleating agent and a hydrocarbon resin, and
  a second exterior layer comprising a polyethylene-based material.
B. The lid packaging component according to any other embodiment, wherein the inorganic particle comprises calcium carbonate and the amount of inorganic particle in the first exterior layer is between 10% and 50%, by weight.
C. The lid packaging component according to any other embodiment, wherein the second exterior layer comprises at least one of a polyethylene plastomer or an ethylene vinyl acetate copolymer.
D. The lid packaging component according to any other embodiment, wherein the lid packaging component has a heat seal initiation temperature of less than 130° C. when the lid packaging component is sealed to high-density polyethylene under conditions of 0.5 seconds and 30 psi.
E. The lid packaging component according to any other embodiment, wherein the polyethylene-based material has a heat seal strength between 3 N/2.5 cm and 29.4 N/2.5 cm when the lid packaging component is heat sealed to high-density polyethylene at conditions of 0.5 seconds and 30 psi.
F. The lid packaging component according to any other embodiment further comprising printed indicia adjacent to the first exterior layer.
G. The lid packaging component according to any other embodiment further comprising a second interior layer comprising an ethylene vinyl alcohol copolymer.
H. The lid packaging component according to any other embodiment, wherein the lid packaging component has a puncture resistance of less than 7 Newtons (ASTM F1306).
I. The lid packaging component according to any other embodiment, wherein the lid packaging component has a puncture resistance of less than 12 Newtons (ASTM F1306).
J. A lid packaging component comprising:
  a first exterior layer comprising a high-density polyethylene and an inorganic particle,
  a first interior layer comprising a high-density polyethylene and a hydrocarbon resin, and
  a second exterior layer, and
  wherein the first interior layer has a volume that is from 50% to 90% of the total volume of the lid packaging component, and wherein the lid packaging component has a heat seal initiation temperature of less than 130° C. when heat sealed to high-density polyethylene under conditions of 0.5 seconds and 30 psi.
K. The lid packaging component according to any other embodiment, wherein the lid packaging component has a total composition suitable for recycling.
L. The lid packaging component according to any other embodiment, wherein the lid packaging component is essentially free from polyester, ethylene vinyl alcohol copolymer and polyamide.
M. A packaged product comprising:
  a thermoformed base comprising at least one cavity and a flange surrounding each of the cavities,
  a lid packaging component according to any one of embodiments A-L, and
  a product,
  wherein the lid packaging component is hermetically sealed to the flange of the thermoformed base and the product is enclosed in the at least one cavity of the thermoformed base.
N. The packaged product according to any other embodiment, wherein the thermoformed base comprises a high-density polyethylene.
O. The packaged product according to any other embodiment, wherein the lid packaging component is peelably sealed to the flange of the thermoformed base component.
P. The packaged product according to any other embodiment, wherein both the thermoformed base and the lid packaging component are recyclable in the same recycle process.
Q. The packaged product according to any other embodiment, wherein the cavity of the thermoformed base may be depressed manually and the product may be pushed through the lid packaging component for product dispensing.
R. The packaged product according to any other embodiment, wherein the thermoformed base component comprises a thermoformable base film comprising
  a first layer comprising a high-density polyethylene and a nucleating agent,
  a second layer comprising a high-density polyethylene, optionally a hydrocarbon resin and optionally a nucleating agent, and
  a third layer comprising a high-density polyethylene and a nucleating agent,
  wherein the second layer is located between the first layer and the third layer.

What is claimed is:
1. A lid packaging component comprising:
  a first exterior layer comprising a high-density polyethylene and an inorganic particle,
  a first interior layer comprising a high-density polyethylene, a nucleating agent and a hydrocarbon resin, and
  a second exterior layer comprising at least one of a polyethylene plastomer or an ethylene vinyl acetate copolymer wherein the lid packaging component has a heat seal initiation temperature of less than 130*C when the lid packaging component is sealed to high-density polyethylene under conditions of 0.5 seconds and 30 psi.
2. The lid packaging component according to claim 1, wherein the inorganic particle comprises calcium carbonate and the amount of inorganic particle in the first exterior layer is between about 10% and 50%, by weight.

3. The lid packaging component according to claim 1, wherein the polyethylene-based material has a heat seal strength between 3 N/2.5 cm and 29.4 N/2.5 cm when the lid packaging component is heat sealed to high-density polyethylene at conditions of 0.5 seconds and 30 psi.

4. The lid packaging component according to claim 1, further comprising printed indicia adjacent to the first exterior layer.

5. The lid packaging component according to claim 1, further comprising a second interior layer comprising an ethylene vinyl alcohol copolymer.

6. The lid packaging component according to claim 1, wherein the lid packaging component has a puncture resistance of less than 7 Newtons (ASTM F1306).

7. The lid packaging component according to claim 1, wherein the lid packaging component has a puncture resistance of less than 12 Newtons (ASTM F1306).

8. A packaged product comprising:
a thermoformed base comprising at least one cavity and a flange surrounding each of the cavities,
the lid packaging component according to claim 1, and a product,
wherein the lid packaging component is hermetically sealed to the flange of the thermoformed base and the product is enclosed in the at least one cavity of the thermoformed base.

9. The packaged product according to claim 8, wherein the thermoformed base comprises a high-density polyethylene.

10. The packaged product according to claim 8, wherein the lid packaging component is peelably sealed to the flange of the thermoformed base component.

11. The packaged product according to claim 8, wherein both the thermoformed base and the lid packaging component are recyclable in the same recycle process.

12. The packaged product according to claim 8, wherein the cavity of the thermoformed base is may be depressed manually and the product may be pushed through the lid packaging component for product dispensing.

13. The packaged product according to claim 8, wherein the thermoformed base component comprises a thermoformable base film comprising
a first layer comprising a high-density polyethylene and a nucleating agent,
a second layer comprising a high-density polyethylene, and
a third layer comprising a high-density polyethylene and a nucleating agent,
wherein the second layer is located between the first layer and the third layer.

14. A lid packaging component comprising:
a first exterior layer comprising a high-density polyethylene and an inorganic particle,
a first interior layer comprising a high-density polyethylene and a hydrocarbon resin, and
a second exterior layer, and
wherein the first interior layer has a volume that is from 50% to 90% of the total volume of the lid packaging component, and
wherein the lid packaging component has a heat seal initiation temperature of less than 130° C. when heat sealed to high-density polyethylene under conditions of 0.5 seconds and 30 psi.

15. The lid packaging component according to claim 14, wherein the lid packaging component has a total composition suitable for recycling.

16. The lid packaging component according to claim 14, wherein the lid packaging component is essentially free from polyester, ethylene vinyl alcohol copolymer and polyamide.

17. A lid packaging component comprising:
a first exterior layer comprising a high-density polyethylene and an inorganic particle,
a first interior layer comprising a high-density polyethylene, a nucleating agent and a hydrocarbon resin, and
a second exterior layer comprising a polyethylene-based material,
wherein the lid packaging component has a heat seal initiation temperature of less than 130° C. when the lid packaging component is sealed to high-density polyethylene under conditions of 0.5 seconds and 30 psi.

* * * * *

UNITED STATES PATENT AND TRADEMARK OFFICE
CERTIFICATE OF CORRECTION

| | |
|---|---|
| PATENT NO. | : 11,952,187 B2 |
| APPLICATION NO. | : 17/438985 |
| DATED | : April 9, 2024 |
| INVENTOR(S) | : Michael D. Priscal and Jacob A. Lasee |

It is certified that error appears in the above-identified patent and that said Letters Patent is hereby corrected as shown below:

In the Specification

Column 6, Line 42 Delete "5135" and insert -- S135 --, therefor.

Column 7, Line 24 Delete "11°C" and insert -- 110° C. --, therefor.

Column 7, Line 38 Delete "homopolym ers" and insert -- homopolymers --, therefor.

Column 7, Line 44 Delete "8°C" and insert -- 80° C. --, therefor.

Column 11, Line 53 Delete "11o" and insert -- 110 --, therefor.

In the Claims

Column 14, Line 60 In Claim 1, delete "130*C" and insert -- 130° C. --, therefor.

Column 15, Line 39 In Claim 12, before "depressed", delete "may be".

Column 15, Line 40 In Claim 12, delete "may be" and insert -- is --, therefor.

Signed and Sealed this
Thirteenth Day of January, 2026

John A. Squires
*Director of the United States Patent and Trademark Office*